UNITED STATES PATENT OFFICE.

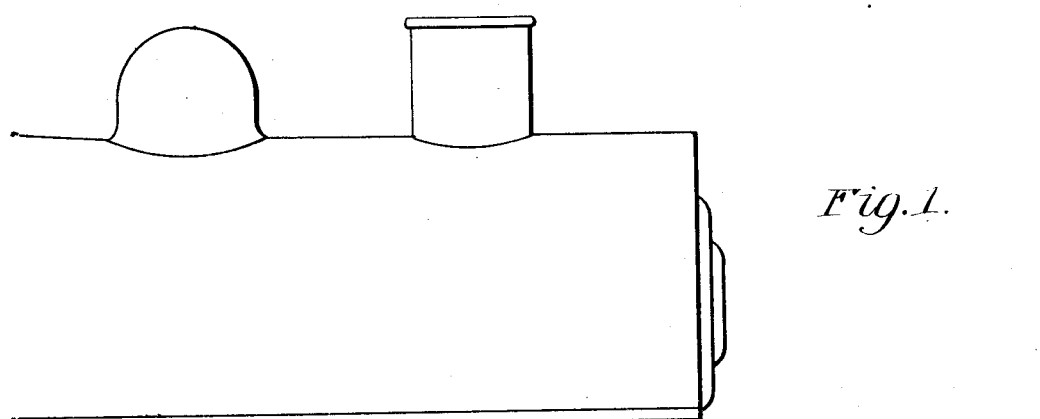
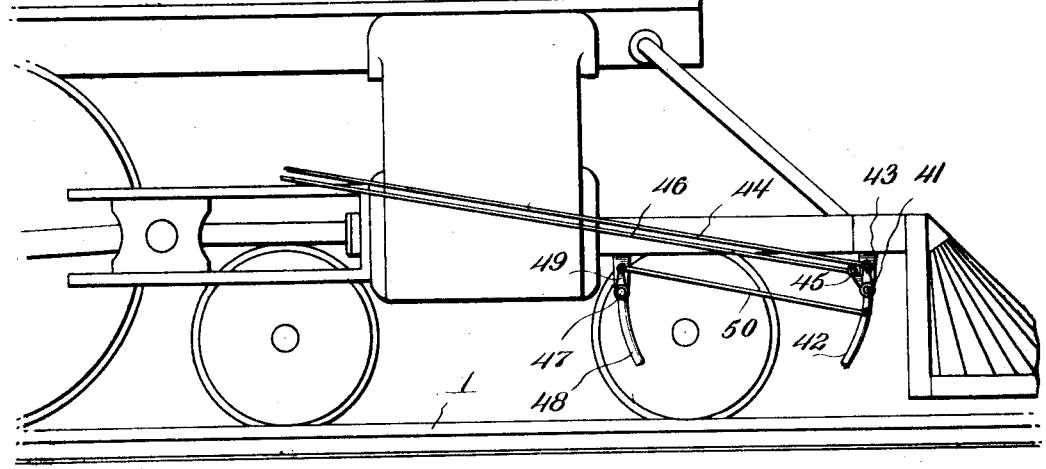

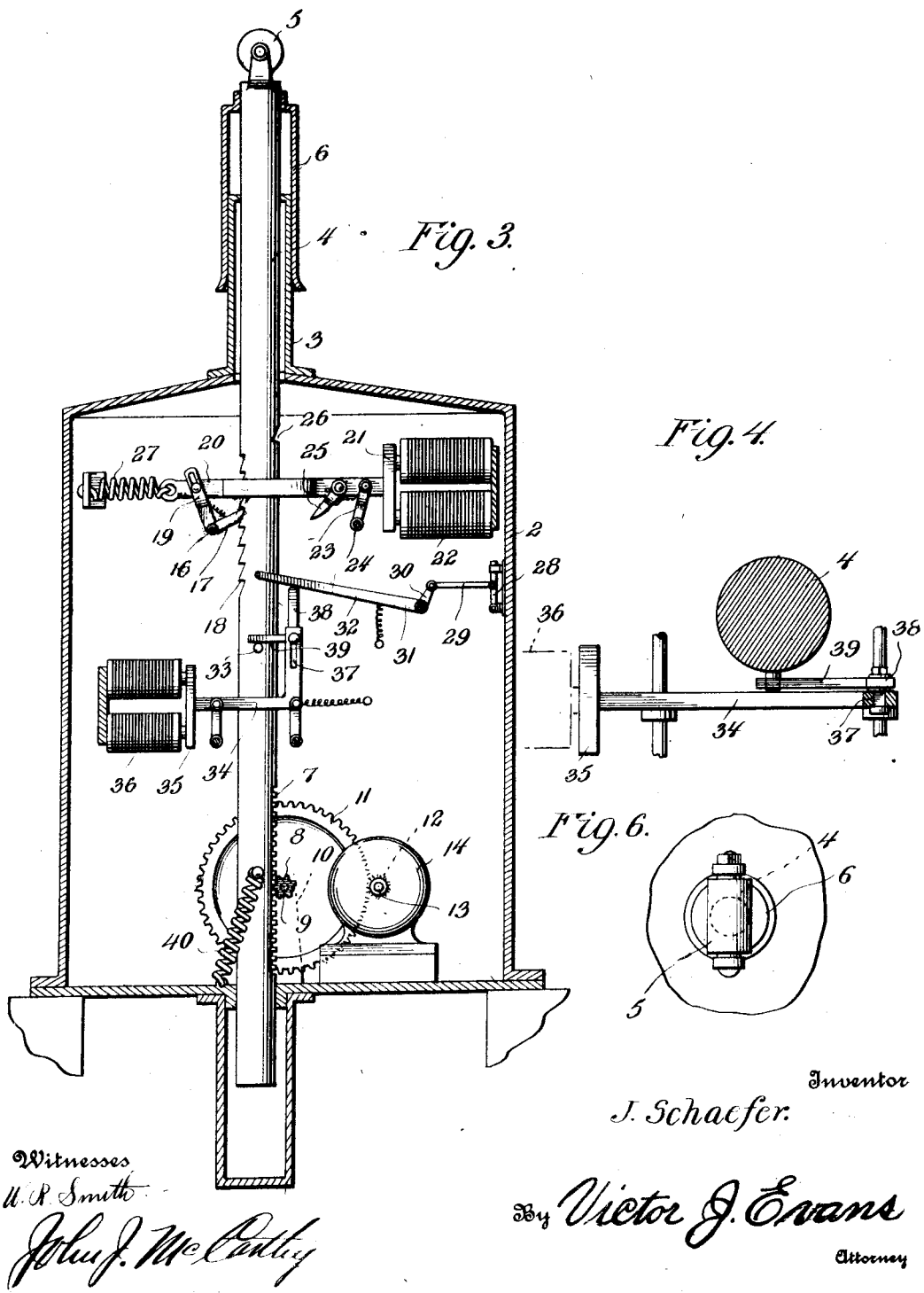

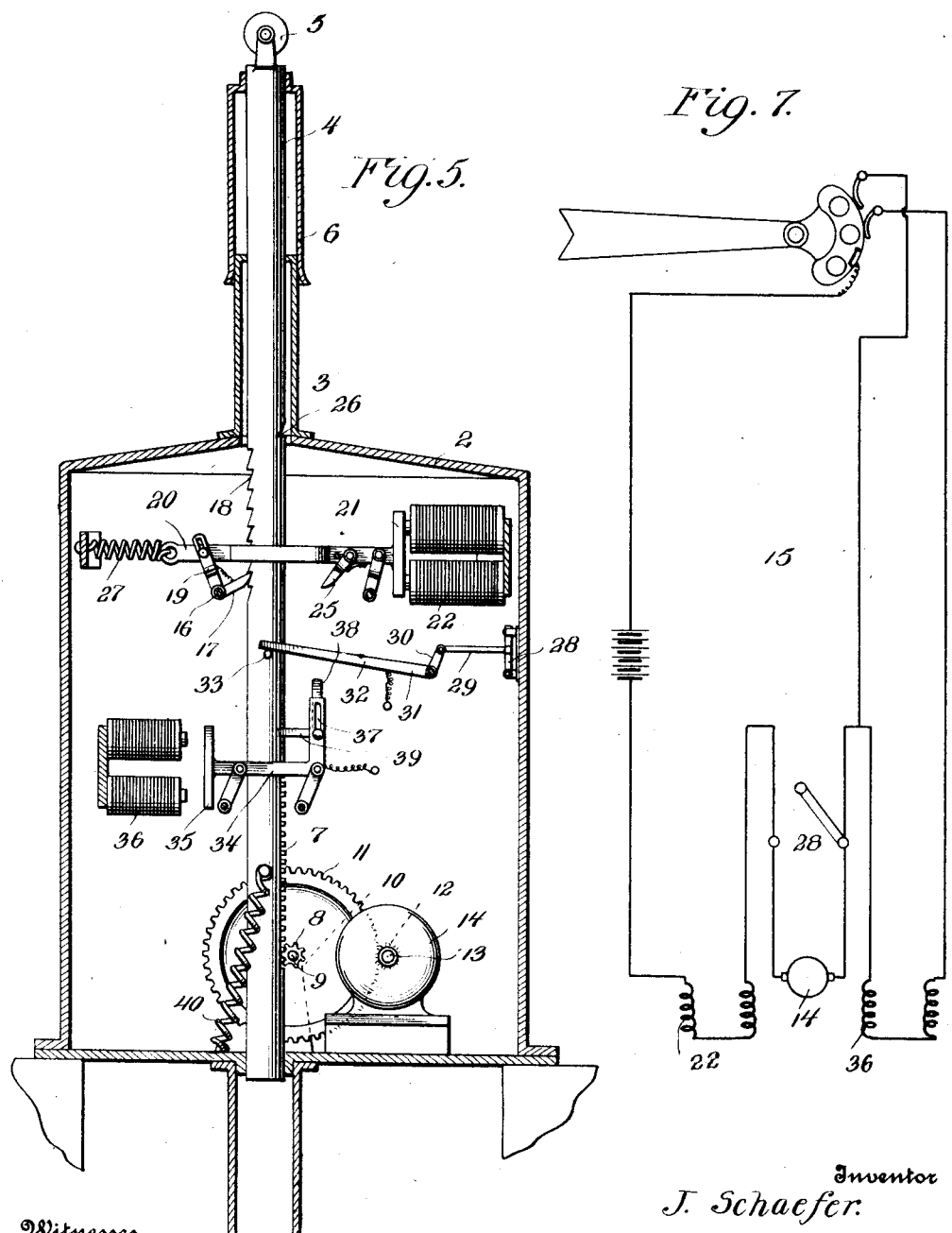

JOHN SCHAEFER, OF GILMANTON, WISCONSIN.

AUTOMATIC TRAIN-STOPPING APPARATUS.

1,113,838.    Specification of Letters Patent.    Patented Oct. 13, 1914.

Application filed March 17, 1914. Serial No. 825,330.

*To all whom it may concern:*

Be it known that I, JOHN SCHAEFER, a citizen of the United States, residing at Gilmanton, in the county of Buffalo and State of Wisconsin, have invented new and useful Improvements in Automatic Train-Stopping Apparatus, of which the following is a specification.

This invention relates to improvements in automatic train stopping apparatus and has particular application to apparatus whereby the propelling power of a car may be cut off and the brake applied in the event of the car or train entering the danger zone.

In carrying out the present invention, it is my purpose to provide an apparatus of the class described which will embody a track instrument capable of being rendered active and inactive and car carried mechanism designed, when engaged by the active track instrument, to cut off the propelling power of the car and effect an application of the brakes.

It is also my purpose to provide an automatic train stop which will operate when the car is "backing" as well as when the car is traveling in the normal direction of traffic.

Furthermore, I aim to provide an apparatus of the type set forth which will embrace the desired features of efficiency and durability, which may be installed and maintained at a minimum expense and which will operate effectively under all weather conditions.

With the above and other objects in view, the invention consists in the construction, combination and arrangement of parts hereinafter set forth in and falling within the scope of the claims.

In the accompanying drawings:—Figure 1 is a fragmentary side elevation of a trackway and motor car thereon equipped with my present invention. Fig. 2 is a fragmentary transverse sectional view through the motor car showing a portion of the car carried mechanism. Fig. 3 is an enlarged vertical sectional view through the track instrument showing the parts in active position. Fig. 4 is a transverse sectional view through the track instrument. Fig. 5 is a fragmentary vertical sectional view through the track instrument showing the parts in caution position. Fig. 6 is a detail plan view of the top of the track instrument. Fig. 7 is a diagram of the circuits employed.

Referring now to the accompanying drawings in detail, 1 designates the trackway. This trackway is preferably divided into blocks in any suitable manner and located at the entrance to each block in the usual semaphore controlling traffic into the block.

Arranged adjacent to the entrance to each block and preferably disposed upon one side of the trackway is a track instrument comprising a casing 2 constructed of suitable weather-proof material and formed with an upwardly extending neck 3. This casing is seated upon and securely fastened to the ties adjacent to one line of rails of the trackway and mounted within the casing and capable of sliding movement therein is a vertical rod 4 extending upwardly through the neck 3 of the casing and having the upper end thereof exteriorly of the neck equipped with a roller 5. A hood 6 is fastened to the rod 4 adjacent to the upper end thereof and is designed to incase the neck 3 when the rod is in inactive position so as to eliminate dirt and other foreign matter from the interior of the casing. This rod 4 is slidably disposed within suitable guides carried by the casing and adjacent to the lower end thereof is formed with a vertical rod or rack teeth 7 with which meshes a pinion 8 keyed upon a stub shaft 9 journaled in bearings 10 carried by the bottom wall of the casing. Keyed upon the stub shaft of the pinion 8 is a gear wheel 11 meshing with a pinion 12 on the armature shaft 13 of an electric motor 14. This motor is connected in an electric circuit 15 including a suitable source of electrical energy and a circuit closer under the control of the signal blade of the adjacent semaphore so that when the signal blade goes to danger the circuit 15 will be closed and the motor 14 energized with the effect to slide the rod 4 upwardly to active position, as illustrated in Fig. 3.

Rotatably mounted within horizontally alining bearings arranged within the casing transversely thereof at one side of the rod 4 is a shaft 16 and fixed upon the shaft is a dog 17 adapted to engage one of a series of notches 18 formed in the adjacent portion of the rod 4, while fixed to the shaft and extending upwardly therefrom at right angles to the dog 17 is an arm 19 having the upper end thereof pivotally connected with a horizontally disposed rod 20 equipped at one end with an armature 21 disposed within the influence of an electromagnet 22 suitably supported within the casing and connected in series in the circuit 15. The armature end of the rod 20 is connected to the upper end of a link 23 having the lower end pivoted as at 24 and acting to support the armature end of the rod. A spring actuated dog 25 is pivotally secured to the rod adjacent to the link 23 and is adapted to engage a notch 26 formed in the adjacent portion of the rod 4. By means of this construction, it will be seen that when the circuit 15 is closed as previously described, the magnet 22 will be energized simultaneously with the motor and the armature 21 drawn into engagement with the pole faces of such magnet thereby sliding the rod 20 with the effect to rock the shaft 16 and swing the dog into a position to engage one of the notches of the series 18 thereby holding the rod 4 elevated independently of the motor. Upon the breaking of the circuit 15 the rod 20 and dog 17 are restored to normal position by means of a coiled contractile spring 27, such spring having one end fastened to the rod 20 and the opposite end secured to an appropriate part of the casing 2. Upon the movement of the rod 20 to normal position, the dog 17 disengages the respective tooth of the series 18 with the effect to release the rod 4 and permit the latter to gravitate to lowered or inactive position and as the rod reaches inactive position the dog 25 engages the notch 26 on the rod with the effect to maintain the latter against upward movement. An electric switch 28 is connected across the terminals of the motor 14 and the blades of such switch are connected with one end of a link 29, such link having the opposite end thereof connected with the vertical limb 30 of a bell crank lever 31 pivoted within the casing and having a relatively long limb 32. The outer end of the limb 32 of the bell crank lever 31 is disposed in the path of movement of a pin 33 carried by the rod 4 and as the rod 4 moves to active position under the action of the motor the pin 33 engages the adjacent arm of the bell crank lever 31 with the effect to swing the latter and so actuate the link 29 to close the switch 28 thereby short circuiting the motor 14. Thus, the motor is de-energized while the rod 4 is held in active position under the action of the dog 17, rod 20, armature 21 and magnet 22.

In some instances as where a caution signal is displayed, it may be desired to check the upward movement of the rod 4 so as to hold the rod in semi-elevated position and for this purpose I employ a horizontal rod 34 mounted for sliding movement within suitable bearings and equipped at one end with an armature 35 disposed within the influence of the poles of a magnet 36. Connected to the opposite end of the rod 34 and upstanding therefrom in parallelism with the rod 4 and disposed adjacent to the latter is a guide 37 while mounted within the guide and capable of sliding movement therein is a stem 38 provided with an outwardly projecting pin 39 working within a slot formed in the guide. The upper end of the stem 38 terminates a short distance below the relatively long arm of the bell crank lever 31, while the pin 39 is disposed above the pin 33 on the rod 4 when the latter is in normal position. The magnets 36 and 22 and the motor 14 are connected in series in the circuit 15 when the blade is at caution position so that the latter is actuated to elevate the rod 4, the dog 25 disengaged from the notch 26 and the dog 17 moved into engagement with the adjacent portion of the rod 4, and the armature 35 thrown into engagement with the poles of the magnet 36 thereby disposing the pin 39 in the path of movement of the pin 33 so that as the rod moves upwardly under the action of the motor the pin 33 engages the pin 39 and so elevates the stem 38 with the effect to engage the upper end of such stem with the long arm of the bell crank lever 31 and thereby actuate the switch 28 to short circuit the motor 14. In the present instance, a coiled contractile spring 40 has one end fastened to the rod 4 and the opposite end secured to the bottom wall of the casing 2 and acts to restore the rod to normal or inactive position succeeding the release of such rod by the latching dog 17.

In the embodiment of my invention selected for illustrative purposes the car carried mechanism comprises a horizontal shaft 41 journaled in suitable bearings arranged transversely of the motor car. Connected to the opposite ends of this shaft and depending therefrom are arms 42, 42 while extending upwardly from the shaft adjacent to one end thereof is a lug 43 to which is connected one end of a rod 44 connected with an element controlling the propelling power of the motor car. In the present instance, the car carried stopping mechanism is shown as applied to a steam locomotive and the rod 44 is connected in some suitable manner with the throttle valve of the car. Connected with the shaft 41 and spaced a suitable distance from the lug 43 is a lug 45 to which is connected a rod 46 having suitable connections with the engineer's brake valve and adapted to actuate such valve to effect an application of the brakes. The arms 42, 42 at the opposite sides of the car are preferably inclined rearwardly as illustrated in Fig. 1 and arranged at the rear of each arm and suitably connected to the frame of the motor car is a stub shaft 47 upon which is pivoted an arm 48 inclined forwardly or in a direction reverse to that of the adjacent arm 42.

Connected with the upper end of each arm 48 is a lug 49 fastened through the medium of a rod 50 with the adjacent arm 42 below the shaft 41.

From the foregoing description taken in connection with the accompanying drawings, the construction and mode of operation of my improved train stopping apparatus will be readily apparent.

In practice, when a signal blade goes to danger the adjacent track instrument is actuated and the rod 4 elevated as previously described and disposed in the path of movement of one of the arms 42 on the motor car. Should the motor car attempt to pass the danger signal the respective arm 42 will be actuated to rock the shaft 41 and so actuate the rods 44 and 46 with the effect to cut off the propelling power of the car and apply the brakes. In the event of the motor car running rear end first or against the normal direction of traffic the arm 48 will contact with the active rod 4 of the track instrument and rock the shaft 41 as just described, incident to the connections between the arm 48 and the arm 42. On the other hand, should the signal blade be in caution position, the magnet 36 will be connected in series in the circuit 15 and energized simultaneously with the magnet 22 and the motor 14 thereby raising the rod 4 previous to the latter reaching the end of its path of movement. In this position of the rod 4 the arm 42 of a passing train will engage the rod and rock the shaft 41 a distance sufficient to cut down the flow of steam to the drive cylinders of the engine and effect a service application of the brakes. Thus, the train may pass the caution signal at a reduced speed.

While I have herein shown and described one preferred form of my invention by way of illustration, I wish it to be understood that I do not limit or confine myself to the precise details of construction herein described and delineated, as modification and variation may be made within the scope of the claims without departing from the spirit of the invention.

I claim:—

1. In train stopping apparatus, a track instrument comprising a rod capable of movement to active and inactive positions, an electric motor for moving said rod to active position, a catch for holding said rod in active position, an electromagnet for operating said catch, an electric circuit including said magnet and motor in series, and means operable to short circuit said motor succeeding the movement of the rod to active position.

2. In train stopping apparatus, a track instrument comprising a rod capable of movement to active and inactive positions, an electric motor for moving said rod to active position, a catch for holding said rod in active position, an electromagnet for operating said catch, an electric circuit including said magnet and motor in series, and a switch operable from said rod to short circuit said motor succeeding the movement of the rod to active position.

3. In train stopping apparatus, a track instrument comprising a rod capable of movement to active and inactive positions, an electric motor for moving said rod to active position, a catch for holding said rod in active position, an electromagnet for operating said catch, an electric circuit including said magnet and motor in series, a switch for short circuiting said motor, and means for actuating said switch previous to the rod reaching the limit of its movement to active position.

4. In train stopping apparatus, a track instrument comprising a rod capable of movement to active and inactive positions, an electric motor for moving said rod to active position, a catch for holding said rod in active position, an electromagnet for operating said catch, an electric circuit including said magnet and motor in series, a switch for short circuiting said motor, means for actuating said switch previous to said rod reaching the limit of its movement to active position, and an electromagnet adapted to be connected in series in said circuit to actuate said last means.

In testimony whereof I affix my signature in presence of two witnesses.

JOHN SCHAEFER.

Witnesses:
 JOHN SALWEY,
 FRED KORTE.